(12) United States Patent
Robertson

(10) Patent No.: US 11,620,295 B2
(45) Date of Patent: Apr. 4, 2023

(54) METHOD, SYSTEM AND PROGRAM PRODUCT FOR MONITORING EAS DEVICES

(71) Applicant: Digital Alert Systems, Inc., Lyndonville, NY (US)

(72) Inventor: William Guy Robertson, Bradenton, FL (US)

(73) Assignee: Digital Alert Systems, Inc., Lyndonville, NY (US)

( * ) Notice: Subject to any disclaimer, the term of this patent is extended or adjusted under 35 U.S.C. 154(b) by 86 days.

(21) Appl. No.: 17/486,098

(22) Filed: Sep. 27, 2021

(65) Prior Publication Data

US 2022/0012256 A1 Jan. 13, 2022

Related U.S. Application Data

(63) Continuation-in-part of application No. 16/156,974, filed on Oct. 10, 2018, now abandoned.

(51) Int. Cl.
*G06F 16/2457* (2019.01)
*G06F 16/23* (2019.01)

(52) U.S. Cl.
CPC .... *G06F 16/24578* (2019.01); *G06F 16/2358* (2019.01)

(58) Field of Classification Search
CPC ............... H04L 41/142; H04W 12/128; G06F 11/0766; G06F 11/2038; G06F 11/2097;
(Continued)

(56) References Cited

U.S. PATENT DOCUMENTS 8,112,489 B1* 2/2012 Cox .................... G06F 11/2033
709/224
2008/0001735 A1* 1/2008 Tran ....................... G16H 50/20
340/539.22

(Continued)

OTHER PUBLICATIONS

Monitoring configuration settings devices—Google Patents—May 21, 2021—2 pages.

*Primary Examiner* — Mahran Y Abu Roumi
(74) *Attorney, Agent, or Firm* — Heslin Rothenberg Farley & Mesiti, P.C.

(57) ABSTRACT

A method of monitoring Emergency Alert System (EAS) devices includes providing a system, the system including processor(s) in communication with memory(ies) storing instructions for execution by the processor(s), the instructions enabling monitoring of EAS devices, monitoring by the system the EAS devices for all changes to configuration settings and updates to software and firmware for the EAS devices ("changes"), the system further including database(s) automatically storing data regarding the changes, wherein data regarding changes to configuration settings comprises a copy of the configuration settings, wherein the copy is stored chronologically, and the monitoring includes avoiding use of a threshold. The system creates secondary instance(s) of the database(s), monitors for failures of the database(s) and automatically fail(s) over to the secondary instance(s) when fail(s) occur, notifying by the system designated receiver(s) of the changes, and assisting with filtering and/or sorting of selected data from the database.

15 Claims, 12 Drawing Sheets

(58) Field of Classification Search
CPC . G06F 8/60; G06F 8/70; G08B 29/12; H04M 11/04; H04N 17/00
See application file for complete search history.

(56) References Cited

U.S. PATENT DOCUMENTS

| | | | | |
|---|---|---|---|---|
| 2009/0210241 | A1* | 8/2009 | Calloway | G06Q 50/18 705/317 |
| 2012/0284690 | A1* | 11/2012 | Blakeley | G06F 8/60 717/120 |
| 2012/0310887 | A1* | 12/2012 | Taranov | G06F 11/2038 707/634 |
| 2016/0359702 | A1* | 12/2016 | Besehanic | H04L 67/535 |
| 2017/0124665 | A1 | 5/2017 | Sa | |
| 2017/0339178 | A1* | 11/2017 | Mahaffey | H04L 41/142 |
| 2018/0146088 | A1* | 5/2018 | Moshir | H04W 4/50 |
| 2018/0247520 | A1* | 8/2018 | Yamane | G08B 29/12 |
| 2018/0316698 | A1* | 11/2018 | David | H04L 12/40 |
| 2019/0080306 | A1* | 3/2019 | Schlachet | G06F 11/3006 |
| 2019/0146862 | A1* | 5/2019 | Kephart | G06F 11/0709 714/2 |

\* cited by examiner

METHOD, SYSTEM AND PROGRAM PRODUCT FOR MONITORING EAS DEVICES

CROSS-REFERENCE TO RELATED APPLICATIONS

This application is a continuation-in-part of U.S. patent application Ser. No. 16/156,974 filed Oct. 10, 2018, the entire disclosure of which is incorporated herein by reference in its entirety.

BACKGROUND OF THE INVENTION

Technical Field

The present disclosure generally relates to Emergency Alert System (EAS) devices satisfying minimum function and testing requirements currently set forth in Title 47 Part 11, subparts 11.32-11.34 and 11.56 (hereinafter, "FCC Part 11"). More particularly, the present disclosure relates to monitoring such devices.

Background Information

Emergency Alert System (EAS) regulations and content distribution technologies continue to evolve—exposing an environment where upgrades and configuration changes require near continuous attention. Add government (e.g., FCC) requirements continually being updated making compliance progressively more complex and, most importantly, organizations who fail or are unable to keep up face increasingly significant fines. Maintenance and compliance costs are non-trivial as any updates to an EAS device requires at a minimum, a virtual "visit" to each and every device, multiply this by the number of devices and even a simple change quickly becomes a large labor cost. Also, every access increases the opportunity for configuration errors further increasing costs and possible customer or regulator dissatisfaction. This level of attention takes specialized expertise requiring a much higher level of understanding across a number of departments; Engineering, Operations, IT Security, Compliance, and Legal, sometimes with multiple members of each department being held responsible for managing different aspects of EAS device compliance. Allowing each group open access is not ideal.

Standard asset management systems or spreadsheets are woefully inadequate for managing active EAS devices since these methods are static and 'disconnected', unable to provide timely or mission critical information.

Thus, there is a need to reduce EAS device costs and complexities, with the minimal amount of necessary staffing to perform all necessary functions.

SUMMARY OF THE INVENTION

The shortcomings of the prior art are overcome and additional advantages are provided through the provision, in one aspect, of a method of monitoring Emergency Alert System (EAS) devices. The method comprises providing a system, the system comprising at least one processor in communication with at least one memory storing instructions for execution by the at least one processor, the instructions enabling monitoring a plurality of EAS devices; monitoring by the system for changes, the changes comprising all changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes; creating by the system at least one secondary instance of the at least one database; monitoring by the system for one or more failures of the at least one database and automatically failing over to the at least one secondary instance when at least one of the one or more failures occurs; notifying by the system at least one designated receiver of one or more of the changes; and assisting by the system with at least one of filtering and sorting of selected data from the database.

In accordance with another aspect, a system for monitoring Emergency Alert System (EAS) devices, the system comprising at least one processor, and at least one memory in communication with the at least one processor, the at least one memory storing instructions for execution by the at least one processor, the instructions enabling a method of monitoring a plurality of EAS devices, the at least one processor and the at least one memory with the instructions stored comprising a system. The method comprises monitoring by the system for changes, the changes comprising all changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes; creating by the system at least one secondary instance of the at least one database; monitoring by the system for one or more failures of the at least one database and automatically failing over to the at least one secondary instance when at least one of the one or more failures occurs; notifying by the system at least one designated receiver of one or more of the changes; and assisting by the system with at least one of filtering and sorting of selected data from the database.

In accordance with yet another aspect, a computer program product is provided. The computer program product comprises a non-transitory storage medium readable by at least one processor, the non-transitory storage medium storing instructions for execution by the at least one processor for performing a method of monitoring Emergency Alert System (EAS) devices. The method comprises monitoring by the system for changes, the changes comprising all changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes; creating by the system at least one secondary instance of the at least one database; monitoring by the system for one or more failures of the at least one database and automatically failing over to the at least one secondary instance when at least one of the one or more failures occurs; notifying by the system at least one designated receiver of one or more of the changes; and assisting by the system with at least one of filtering and sorting of selected data from the database.

In accordance with yet another aspect, a method of monitoring Emergency Alert System (EAS) devices is provided. The method comprises providing a system, the system comprising at least one processor in communication with at least one memory storing instructions for execution by the at least one processor, the instructions enabling monitoring a plurality of EAS devices. The method further comprises monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, creating by the system at least one secondary instance of the at least one database, monitoring by the system for one or more failures of the at least one database and automatically failing over to the at least one secondary instance when at least one of the one or more failures occurs, notifying by the system at least one designated receiver of one or more of the changes, and assisting by the system with at least one of filtering and sorting of selected data from the database.

In accordance with another aspect, a system for monitoring Emergency Alert System (EAS) devices, the system comprising at least one processor, and at least one memory in communication with the at least one processor, the at least one memory storing instructions for execution by the at least one processor, the instructions enabling a method of monitoring a plurality of EAS devices, the at least one processor and the at least one memory with the instructions stored comprising a system. The method comprises monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, creating by the system at least one secondary instance of the at least one database, monitoring by the system for one or more failures of the at least one database and automatically failing over to the at least one secondary instance when at least one of the one or more failures occurs, notifying by the system at least one designated receiver of one or more of the changes, and assisting by the system with at least one of filtering and sorting of selected data from the database.

In accordance with yet another aspect, a computer program product is provided. The computer program product comprises a non-transitory storage medium readable by at least one processor, the non-transitory storage medium storing instructions for execution by the at least one processor for performing a method of monitoring Emergency Alert System (EAS) devices. The method comprises monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, creating by the system at least one secondary instance of the at least one database, monitoring by the system for one or more failures of the at least one database and automatically failing over to the at least one secondary instance when at least one of the one or more failures occurs, notifying by the system at least one designated receiver of one or more of the changes, and assisting by the system with at least one of filtering and sorting of selected data from the database.

Additional features and advantages of this invention will become apparent from the following detailed description of the various aspects of the invention taken in conjunction with the accompanying drawings.

DETAILED DESCRIPTION OF THE INVENTION

Figure 1:
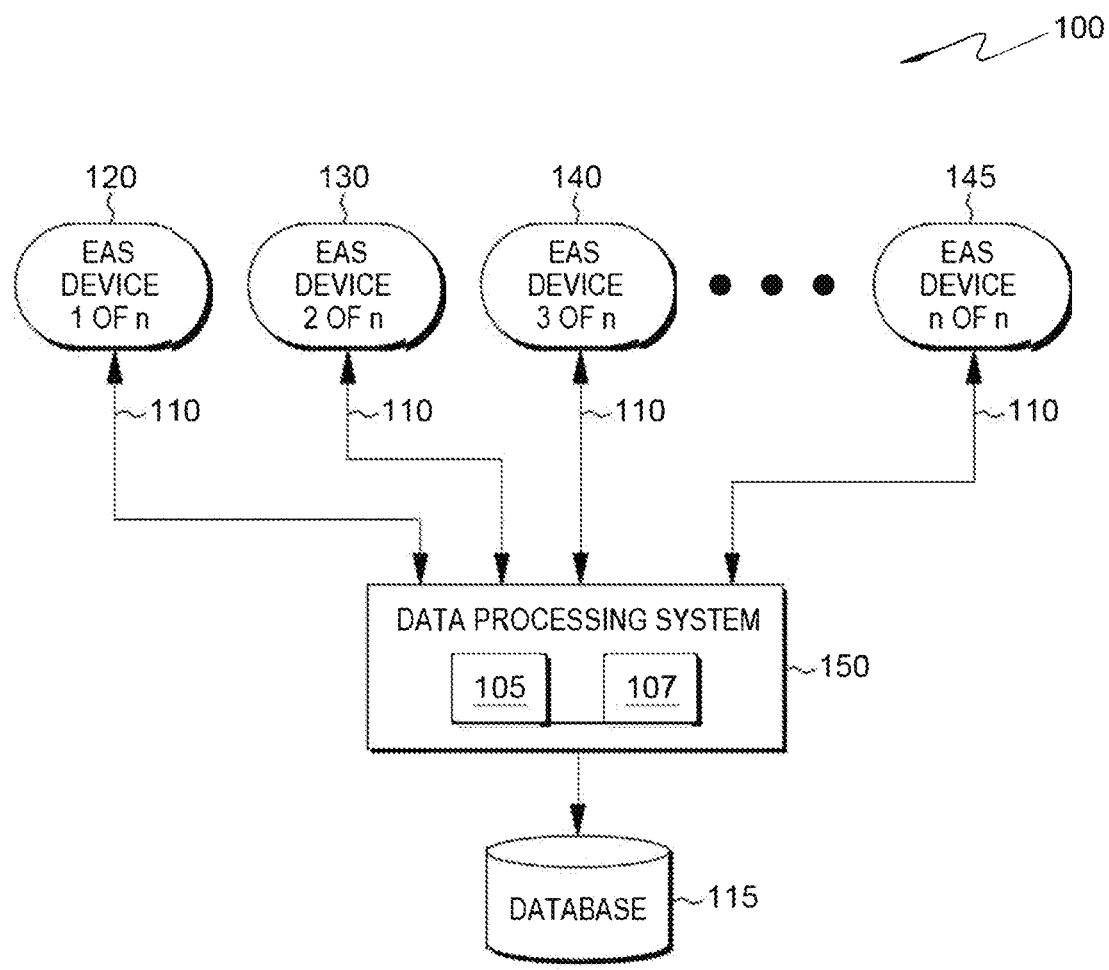
FIG. 1 is a modified flow diagram of one example of one or more EAS devices being linked to the Data Processing System and Database for storing device and management information of a data processing system for monitoring EAS devices, in accordance with one or more aspects of the present disclosure.

The unique operational design herein and requirements for EAS devices requires a completely unique set of tools and processes which are embodied in this disclosure.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "EAS device(s)" refers to FCC (Federal Communications Commission) certified devices capable of performing the minimum encoding and decoding functions and passing test requirements set forth in Title 47 Part 11, subparts 11.32-11.34 and 11.56 (the minimum encoding/decoding functions in FCC Part 11 are reproduced at the end of the detailed description herein and current to the date of filing the application). In addition, such devices may be updatable based on changes in the required functions and/or testing requirements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the exemplary term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a decentralized storage system such as a blockchain implementation, or any suitable combination of the foregoing. In the context of this document, a computer readable storage medium may be any tangible medium that can contain or store a program for use by or in connection with an instruction execution system, apparatus, or device.

Figure 10:
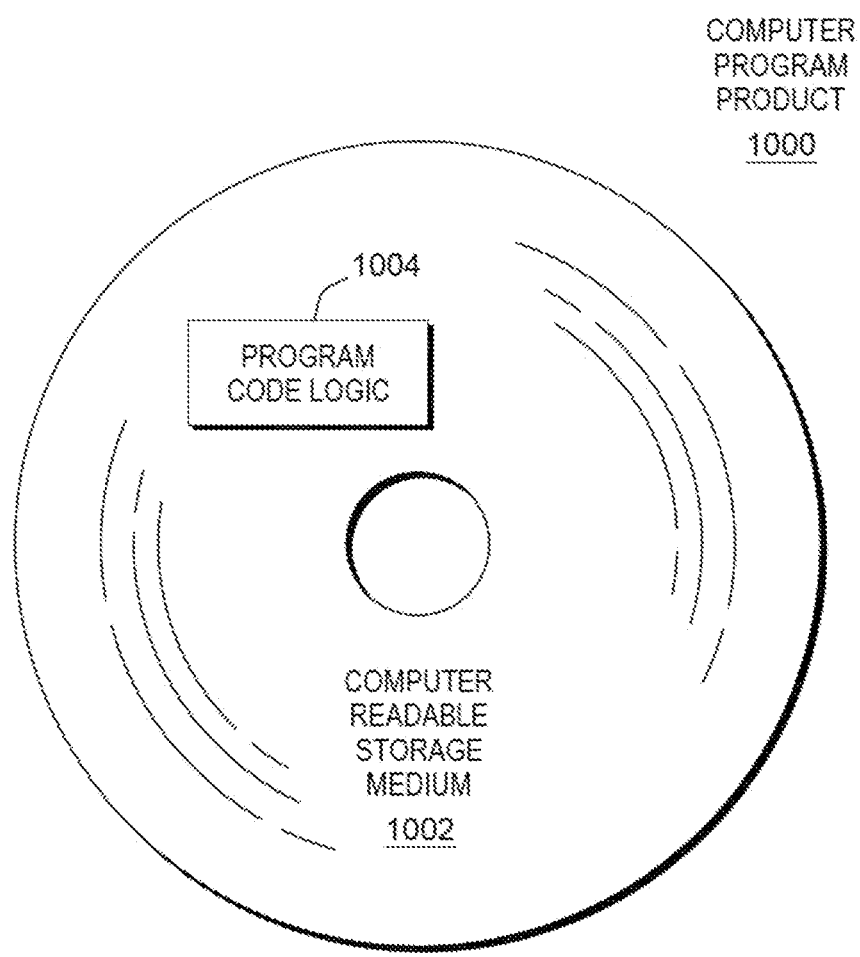
FIG. 10 depicts one example of a computer program product storing program code logic, in accordance with one or more aspects of the present disclosure.

FIG. 10 depicts one example of a computer program product 1000, in this example, a non-transitory storage medium 1002, for example, a CD-ROM storing program code logic 1004 for monitoring EAS devices, in accordance with one or more aspects of the present disclosure.

Figure 11:
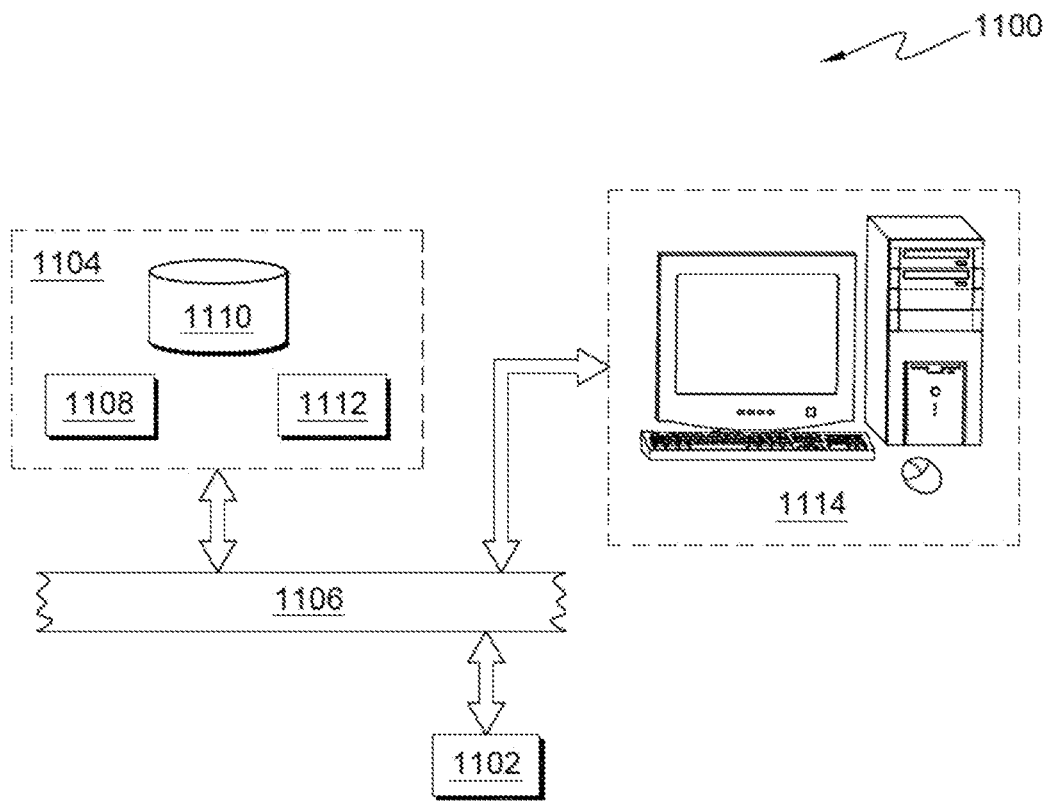
FIG. 11 depicts one example of a data processing system suitable for use with the present disclosure.

FIG. 11 depicts one example of a data processing system 1100 suitable for storing and/or executing program code for implementing the method of the present disclosure is usable that includes at least one processor 1102, coupled directly or indirectly to memory elements 1104 through a system bus 1106, communication with the system being done via, for example, one or more peripherals 1108 or other input/output types, in accordance with one or more aspects of the present disclosure.

Computer program code embodied on a computer readable storage medium may be transmitted using any appropriate technologies, including but not limited to, wireless, wireline, optical fiber cable, Bluetooth, RF, etc., or any suitable combination of the foregoing.

Computer program code for carrying out operations for aspects of the present disclosure may be written in any combination of one or more programming languages, including, for example, an object oriented programming language, such as, for example, JAVA, Smalltalk, C++ or the like, and conventional procedural programming languages, such as, for example, the "C" programming language, PHP programming language, Bash, HTML and/or JavaScript scripting languages, assembler or similar programming languages. The program code may execute, via one or more processors, entirely locally, entirely remotely, a combination of locally and remotely. In the latter scenario, the remote processor may be connected to the user's computer through any type of network, including a local area network (LAN) or a wide area network (WAN), or the connection may be made to an external processor (for example, through the Internet using an Internet Service Provider).

Aspects may be described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams or flowcharts, and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

One or more aspects herein may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices, including, but not limited to, keyboards, displays, pointing devices, DASD, tape, CDs, DVDs, thumb drives and other memory media, touch-screen based devices (e.g., laptop computers, mobile phones, tablets, smart watches, etc.), can be coupled to the system either directly or through intervening I/O controllers. Network adapters may also be coupled to the system to enable the data processing system to become coupled to other data processing systems or remote printers or storage devices through intervening private or public networks. Modems, cable modems, Bluetooth, Wi-Fi, and Ethernet cards are just a few of the available types of network adapters.

The invention goes beyond simple log-gathering and FCC Part 11 minimum requirements to provide a far more comprehensive range of data from each EAS device, including originated, decoded, and forwarded alerts; configuration changes; operational status; current software/hardware versions; and analog and digital monitoring data such as radio frequency, signal strength, and inputs to EAS devices; among a vast amount of other summary detail required by the FCC. In so doing, the invention provides a far more complete picture and greater situational awareness of each EAS device than ever before. Credentialed experts from various departments, such as engineering, compliance, legal, and management, can access this wealth of information in real time—information that otherwise could take days and numerous people to assemble using any other means.

The invention combines EAS operations and compliance under one umbrella for unified monitoring and alerting designated receiver(s) of alerts, log reporting, and error/alarm monitoring.

The invention oversees the health and status of each EAS device, alerting key personnel of critical changes to the configuration settings and software or firmware updates, and consolidating FCC-mandated EAS device test results.

The invention allows for proactively addressing any potential compliance or subscriber issues. For example, the FCC's Sixth Report and Order states that cable operators must report national emergency alert system tests through an online Test Reporting System, meaning participants must fill in at least 81 individual data fields for each EAS device in each national test. Consolidating this information from multiple locations is an incredibly time-consuming task, but the invention provides all the information within minutes of a test ending.

The invention increases security by accepting information only from those devices which meet specific criteria, thereby preventing alerts propagating without being properly vetted. Only those devices whose configurations and other settings deemed acceptable are able to submit alert information to the rest of the system and only those devices with proper license can communicate with the Core Module. Moreover, an operator can "push" updates such as software, device license keys, new or modified configurations, to units in the field, critical for quickly and efficiently replacing or restoring service without requiring a high level of knowledge at the local site—on-site personnel need merely connect and turn on the device—configuration is managed through the operator's expertise.

The invention is designed in a modular fashion so users can scale the perfect solution to fit their specific environment or needs and can be installed on stand-alone hardware or integrated into a large data center in virtual machine environments. Besides scalability, the invention supports redundancy with automatic failover.

Each of the optional modules provides a different view or level of interactivity to meet specific user's requirements. Everything works, in one example, via a secure IP connection between EAS devices and the Core Module, sending information when requested, or when necessary all through a comprehensive database. From this information the Core Module allows other modules to "act" on the data for alerts or sophisticated queries, searches, visual representations, geographic-based displays, and a host of other applications including those timely and critical FCC reports.

Commercially available EAS devices include those offered by, for example, Digital Alert Systems of Lyndonville, N.Y.

Figure 12:
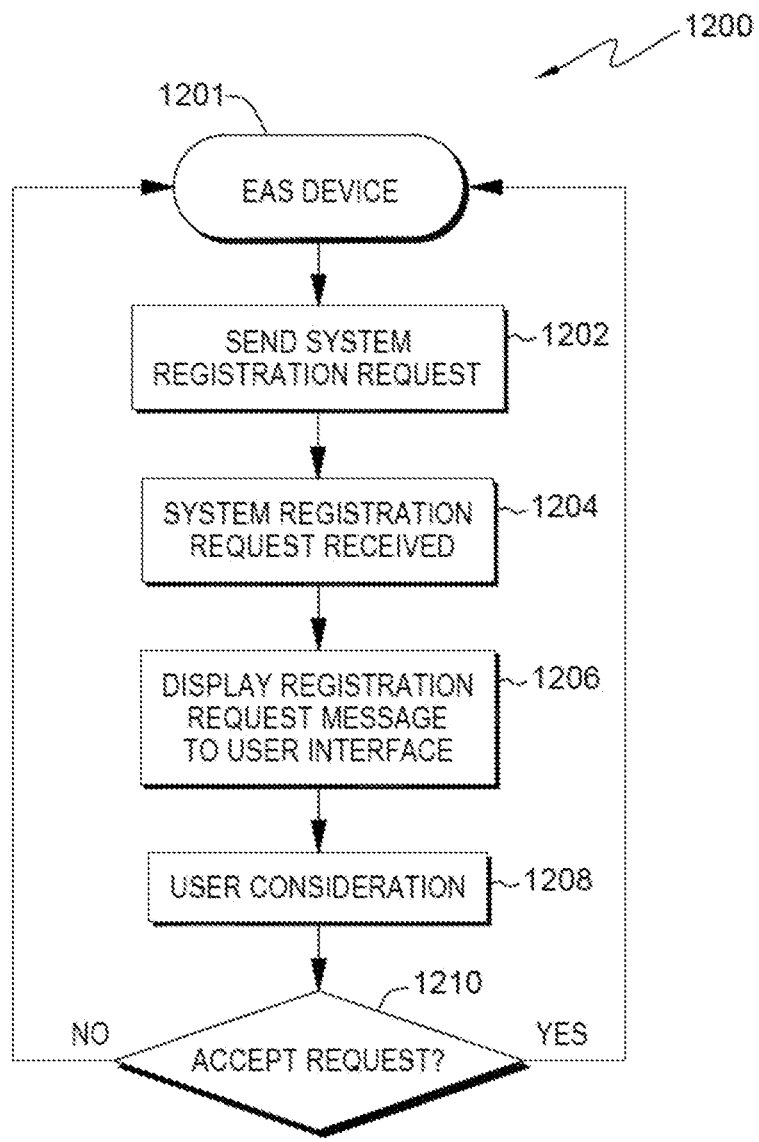
FIG. 12 is a modified flow diagram for one example of registering an EAS device with a data processing system for monitoring EAS devices, in accordance with one or more aspects of the present disclosure.

FIG. 12 is a modified flow diagram 1200 for one example of registering an EAS device with a data processing system, in accordance with one or more aspects of the present disclosure.

EAS device 1201 sends a Registration Request 1202 message to the data processing system received 1204. The data processing system indicates the presence of this request to the user interface 1206. The user considers 1208 the message and can either accept or reject the registration request, inquiry 1210, "accept request?", which returns the Registration Accept/Reject 1210 message to the EAS device.

FIG. 1 is a modified flow diagram 100 of one example of operation of a Core Module 105 and Basic Configuration Module 107, as part of a data processing system 150 for monitoring EAS devices, for example, EAS devices 120, 130, 140 and 145 (note, there could be more or fewer than shown in FIG. 1) over a bi-directional communication link 110, in accordance with one or more aspects of the present disclosure.

The Core Module, which, in one embodiment, requires the Basic Configuration Module, is the central point for EAS device communications, data storage, and connections to other modules. All data is stored in a highly-reliable database 115, for example, an SQL database, where users, permissions, and groups administration is performed through the simple user interface. The Core Module also serves as the secure communications connection point for the data exchanged between EAS devices. In one embodiment, the data processing system provides verbose logging and a unique ability to add a note to any event, which speeds troubleshooting tasks.

The Basic Configuration Module provides critical support for EAS device operations by assuring the latest configuration settings are stored and readily retrievable streamlining initial setup or replacements. In addition, data regarding any and all configuration changes and updates to software and firmware on an EAS device are automatically stored. Data regarding changes to configuration settings comprises a copy of the configuration settings, the copy being stored as a chronological list of files. In this way, users are assured the most current configuration changes and software/firmware updates for every EAS device are saved and accessible.

Figure 2:
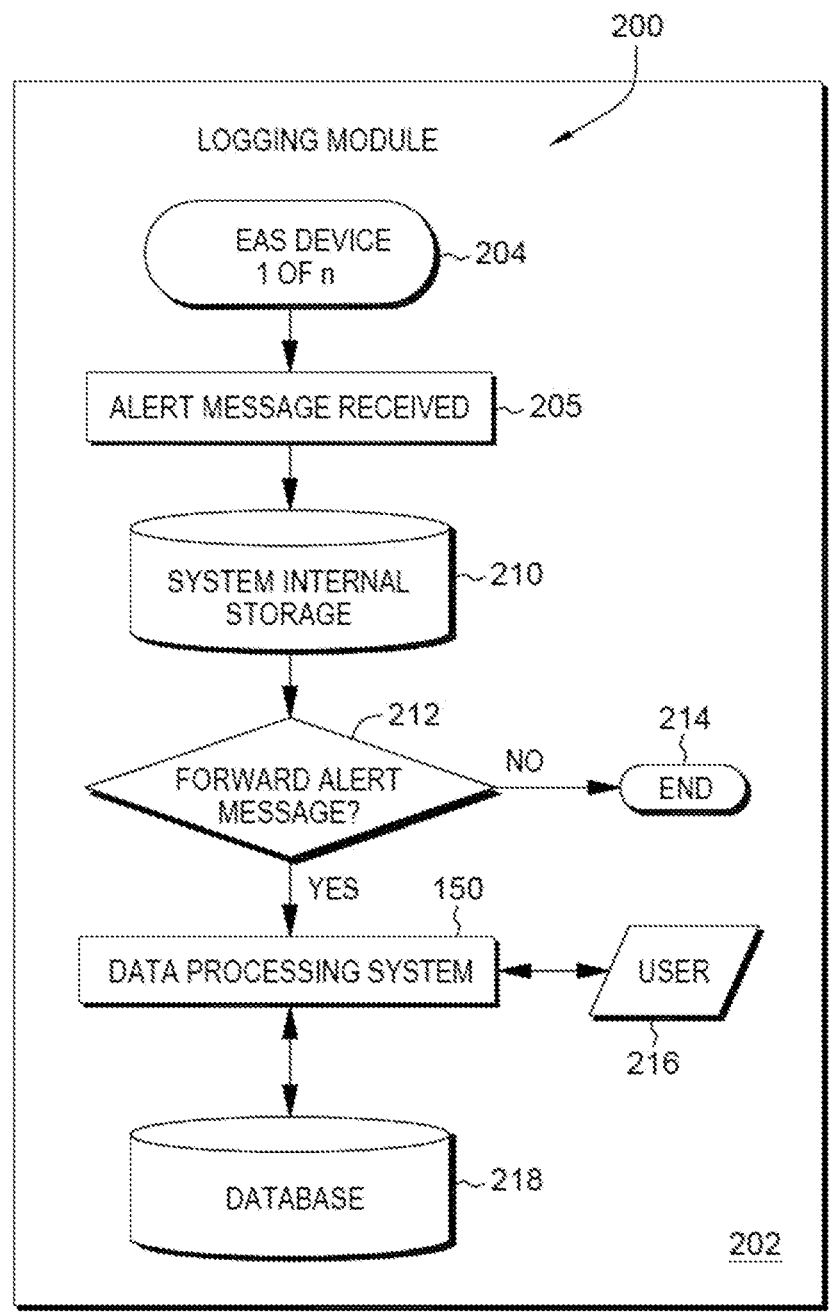
FIG. 2 is a modified flow diagram of one example of the operation of a Logging Module of the data processing system for monitoring EAS devices, in accordance with one or more aspects of the present disclosure.

FIG. 2 is a modified flow diagram 200 of one example of operation of a Logging Module 202 of the data processing system (150, FIG. 1) for monitoring EAS devices, in accordance with one or more aspects of the present disclosure.

The Logging Module provides filtering and sorting features of basic EAS device alert data; alerts decoded, forwarded, and originated, event codes, Federal Information Processing Standard (FIPS) codes, Originators, EAS device Station IDs, and Date/Time for the simplest types of overall report generation.

The EAS devices (collectively, 204) will from time to time receive alert messages 205. All alert messages are recorded on the systems' internal storage 210. Based on a given EAS device's configuration, alert messages are selectively forwarded, inquiry 212, "forward alert message?", to the data processing system 150. If the alert message is not to be forwarded to the data processing system, a "no" answer to inquiry 212, then operation of the Logging Module ends with regard to the present alert message. If the alert message is to be forwarded, a "yes" answer to inquiry 212, then the alert message is forwarded to the data processing system 150. The data processing system stores the alert messages in its database 218 with the associated metadata reflecting the specific EAS device which sent the message.

A user 216 is able to easily recall the messages from the database, using, for example, a series of filters and selectors for data retrieval and thereby is able to export the collected and filtered data in any number of formats. Examples include, but are not limited to, test file (.txt), comma-separated values (.csv), portable document format (.pdf), and direct printing through the user interface.

Figure 3:
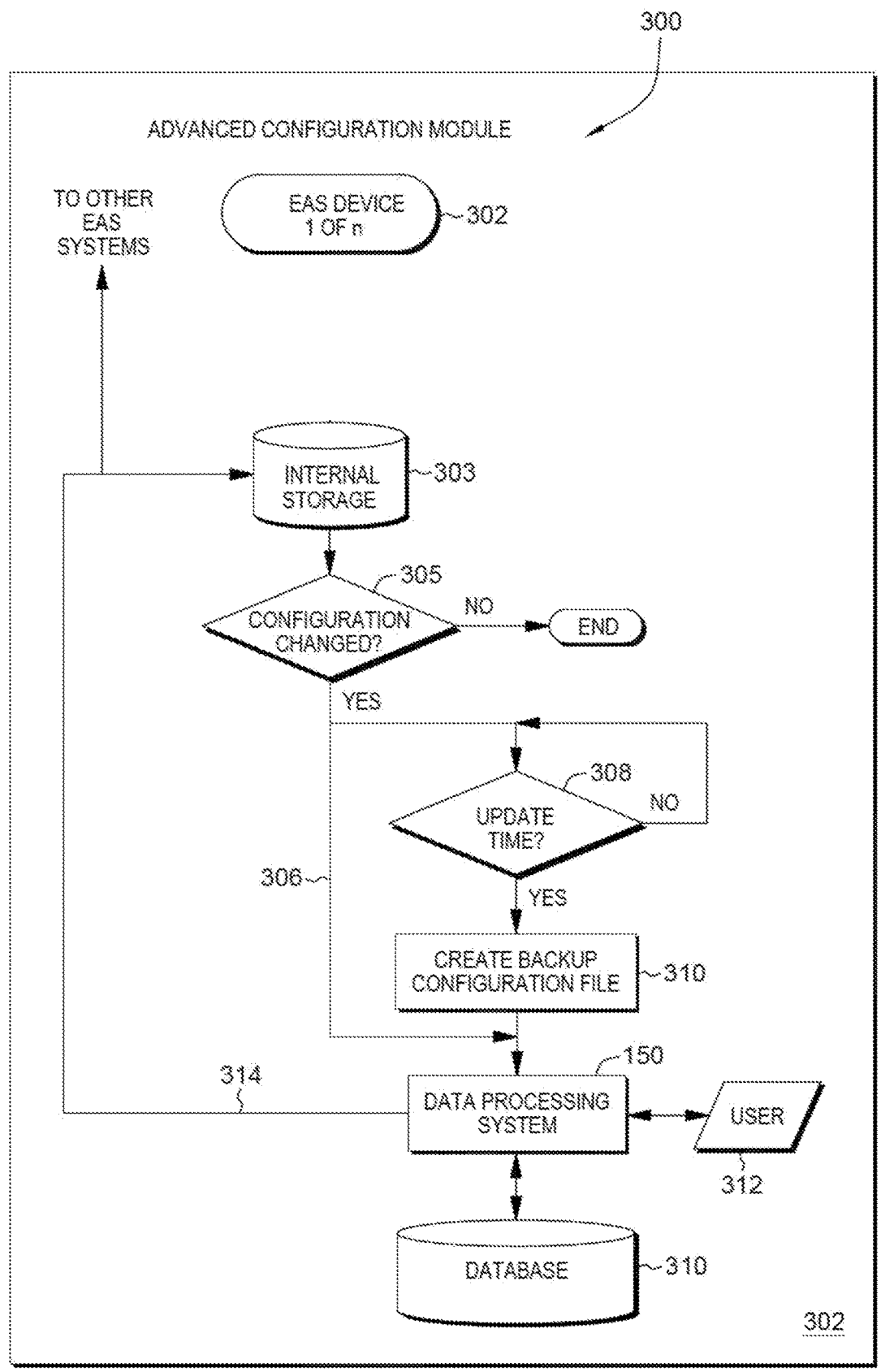
FIG. 3 is a modified flow diagram of one example of the operation of an Advanced Configuration Module, based on the Logging Module of FIG. 2, of the data processing system for monitoring EAS devices, in accordance with one or more aspects of the present disclosure.

FIG. 3 is a modified flow diagram 300 of one example of operation of an Advanced Configuration Module 302 of the data processing system (150, FIG. 1), in accordance with one or more aspects of the present disclosure.

In one embodiment, the Advanced Configuration Module (ACM) significantly enhances EAS device monitoring, enabling users, for example, to review and compare configuration settings directly within the user interface, allowing complex configuration comparisons.

If the current configuration of an EAS device is changed, inquiry 305 ("configuration changed?"), the system will signal a change, a "yes" answer to inquiry 305, as a message 306 was made to the data processing system 150 and invoke a timer monitoring a preset Update Time. When the time is met, a "yes" answer to inquiry 308 ("update time?"), the EAS device will Create a Backup Configuration File 310 and transfer the file to the data processing system 150 for retention in, for example, the database 310 or other system storage.

A data processing system user 312 can retrieve stored Configuration Files and pass them back to the same or any other EAS device as Configuration Update 314 messages. The data processing system is capable of accessing, viewing, and/or comparing any of the Configuration Files in addition to editing, renaming, and storing them in the database (115, FIG. 1) for use on any single or multiple EAS devices.

Figure 4:
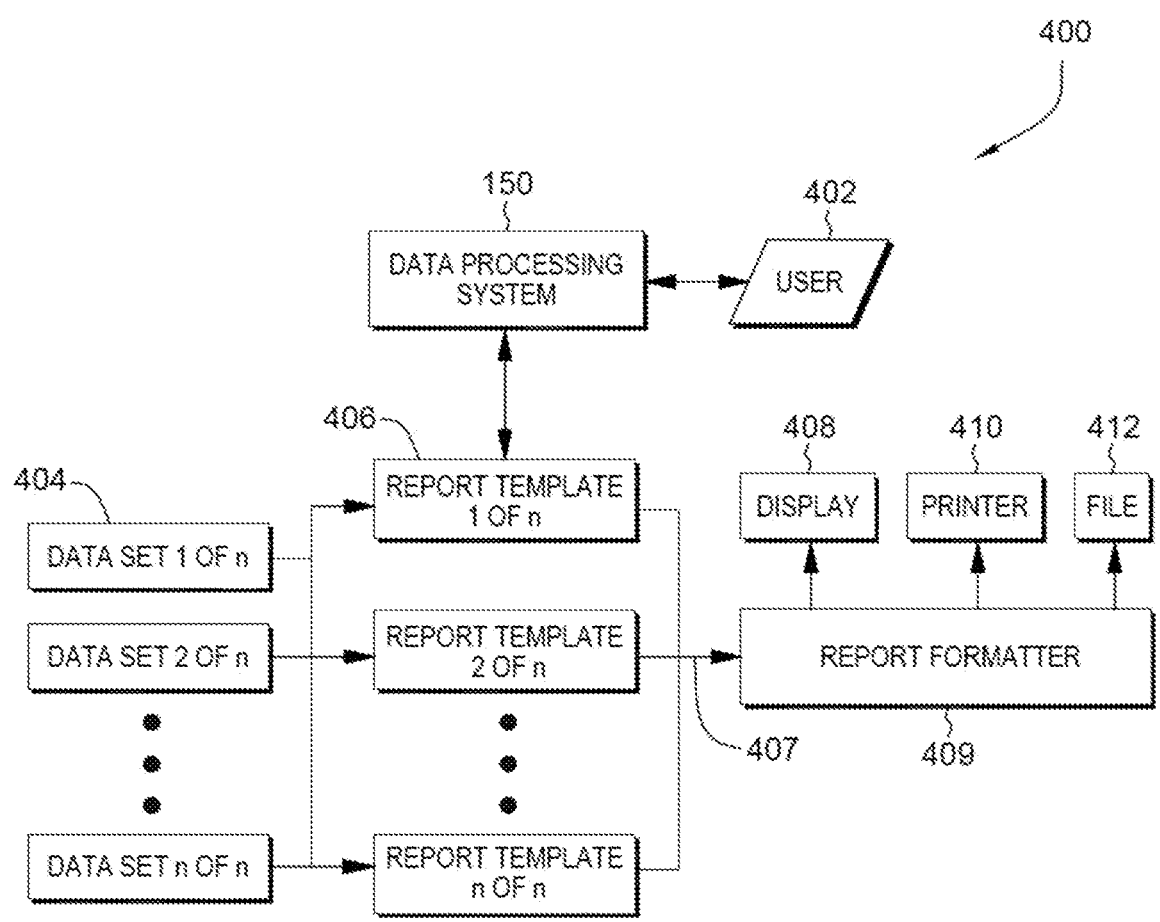
FIG. 4 is a modified flow diagram of one example of the operation of an Advanced Reporting Module, based on the Logging Module of FIG. 2, of the data processing system for monitoring EAS devices, in accordance with one or more aspects of the present disclosure.

FIG. 4 is a modified flow diagram 400 of one example of operation of an Advanced Reporting Module 402 of the data processing system (150, FIG. 1), based on the Logging Module of FIG. 2, in accordance with one or more aspects of the present disclosure.

The Advanced Reporting Module requires the Logging Module and expands the level and detail of reporting beyond the basic reports of the Logging Module. Additional reporting features include, for example: date ranges, filtering, sorting, histograms, charts and calendars. Customizable report templates may be saved for easy recall and generation of new reports following a user-defined set of criteria, say weekly, or monthly reports by region or group, or combine information to assemble an EAS Test Reporting System (ETRS) spreadsheet—greatly streamlining this conventionally labor-intensive process.

The data processing system 150 stores various amounts of information in multiple Data Set forms, for example, Data Set 404. One or more of these data sets can be queried to fill in various information within multiple Report Templates, for example, Reporting Template 406.

When Data Processing System User 402 requests a report template, the data collected and made available 407 to the Report Formatter 409. The Report Formatter's report role is to present the reported information defined in the selected Report Template in one or more ways as selected by the user. These may be, for example, one or more of the following: to a Display 408 device (e.g., computer monitor, projector, etc.), to a Printer 410 or saved as a File 412.

Figure 5:
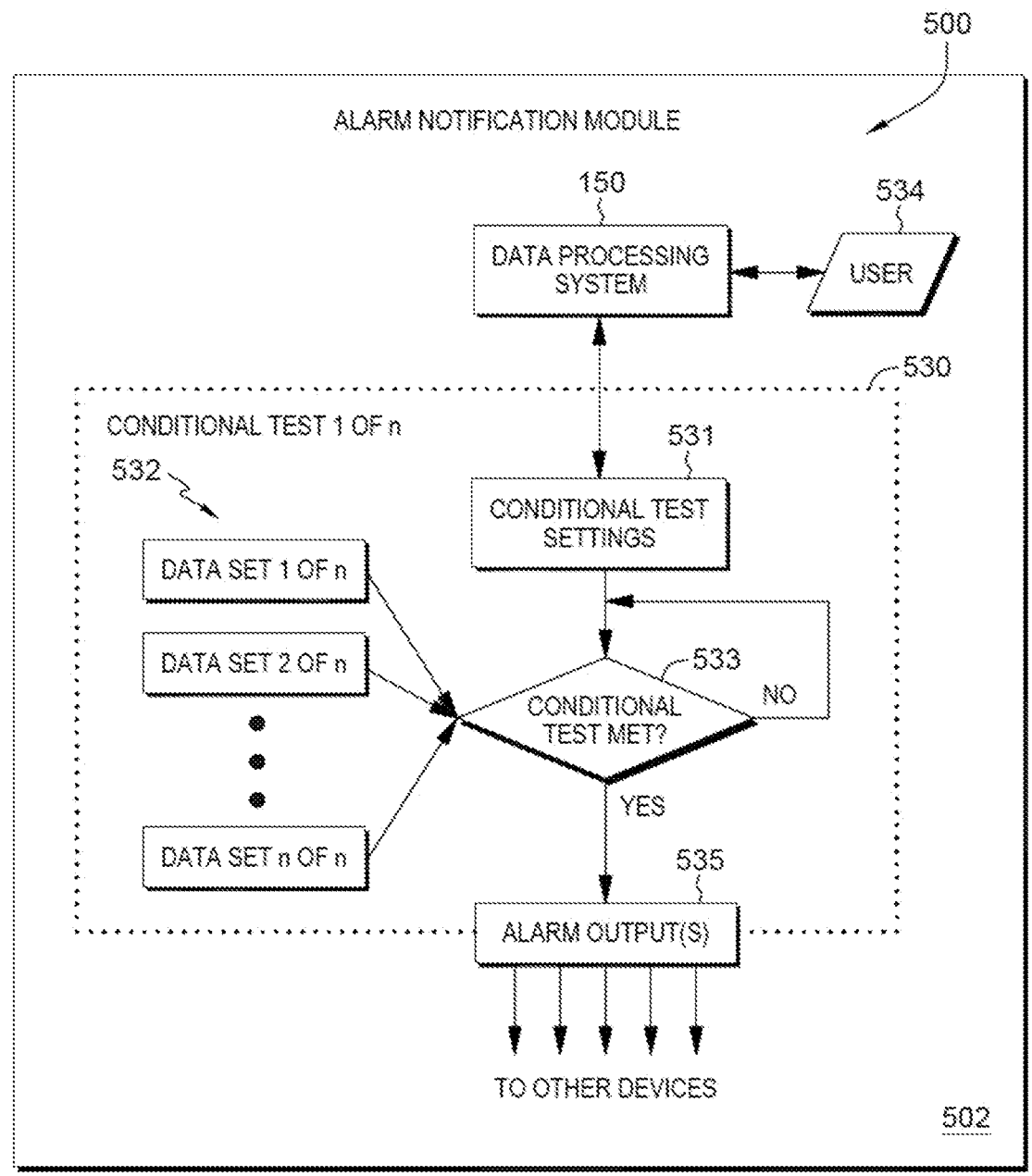
FIG. 5 is a modified flow diagram of one example of the operation of an Alarm Notification Module, based on the Logging Module of FIG. 2, of the data processing system for monitoring EAS devices, in accordance with one or more aspects of the present disclosure.

FIG. 5 is a modified flow diagram 500 of one example of the operation of an Alarm Notification Module 502, based on the Logging Module of FIG. 2, of the data processing system (150, FIG. 1) for monitoring EAS devices, in accordance with one or more aspects of the present disclosure.

Monitoring data for potential problems with EAS devices is the purview of the Alarm Notification Module. The Logging Module is required as the means to gather the necessary data. Setting customizable notifications regarding any number of parameters, fault conditions, changes in overall health indicators, access, configuration changes, a nearly unlimited number of parameters of alarms can be assigned. Each notification may be sent in a variety of manners; via e-mails, SMS messages, and/or on-screen displays, and a consolidated Simple Network Management Protocol (SNMP) Management Information Base (MIB) from a single source rather than from hundreds of individual devices streamlines interfacing with other alarm notification tools.

Data processing system 150 stores various amounts of information in multiple Data Set 532 forms. One or more of these data sets can be queried to determine various conditions a data processing system user 534 may set within the Conditional Test Setting 531. The Condition Test Met will continually test for the preset values and, when the conditions are met (a "yes" answer to inquiry 533), it will send a message to the Alarm Output 535 for communications to one or more devices.

Figure 6:
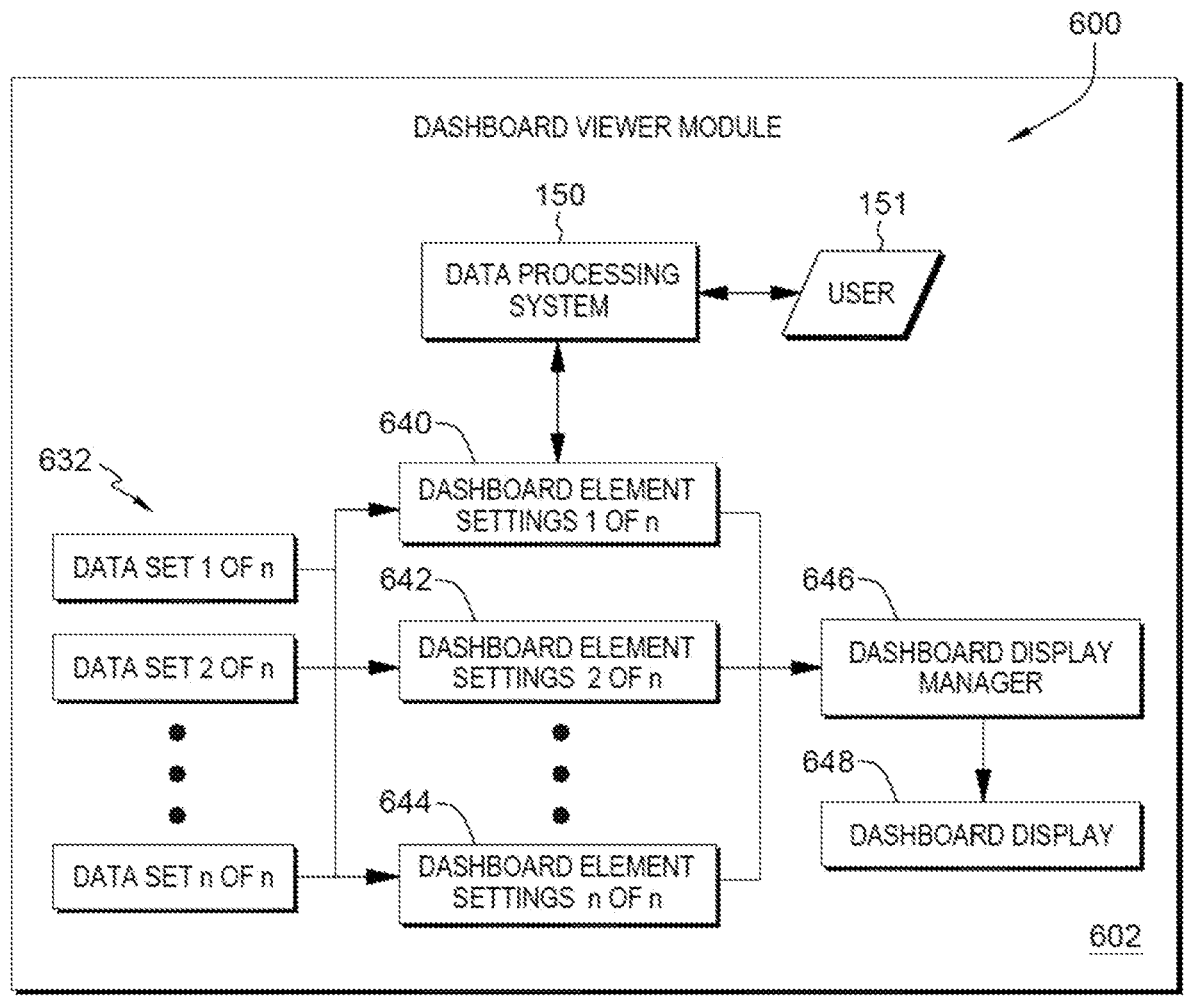
FIG. 6 is a modified flow diagram of one example of the operation of a Dashboard Viewer Module, based on the Logging Module of FIG. 2, of the data processing system for monitoring EAS devices, in accordance with one or more aspects of the present disclosure.

FIG. 6 is a modified flow diagram 600 of one example of the operation of a Dashboard Viewer Module 602, based on the Logging Module of FIG. 2, of the data processing system 150 for monitoring and managing EAS devices, in accordance with one or more aspects of the present disclosure.

Visualization tools provide customizable information displays, for example, dashboard views for each user or group. Dashboards include items such as lists/tabular data, maps with data pins or shaded/affected areas. Rollover/mouseover information provides, for example, device name, monitoring source status and last EAS device alert information. With the unique browser integration, users can directly access the EAS device within the same screen. This is very useful when checking real-time information or making changes directly on a device. Using the Dashboard Viewer Module each user can see what is most important to them.

The data processing system 150 stores various amounts of information in multiple Data Set 632 forms. One or more of these data sets can be queried using a Dashboard Element Setting (DES) process, for example, DES 640, 642 or 644. The results are then available to the Dashboard Display Manager 646 for integration and presentation on the Dashboard Display 648.

Figure 7:
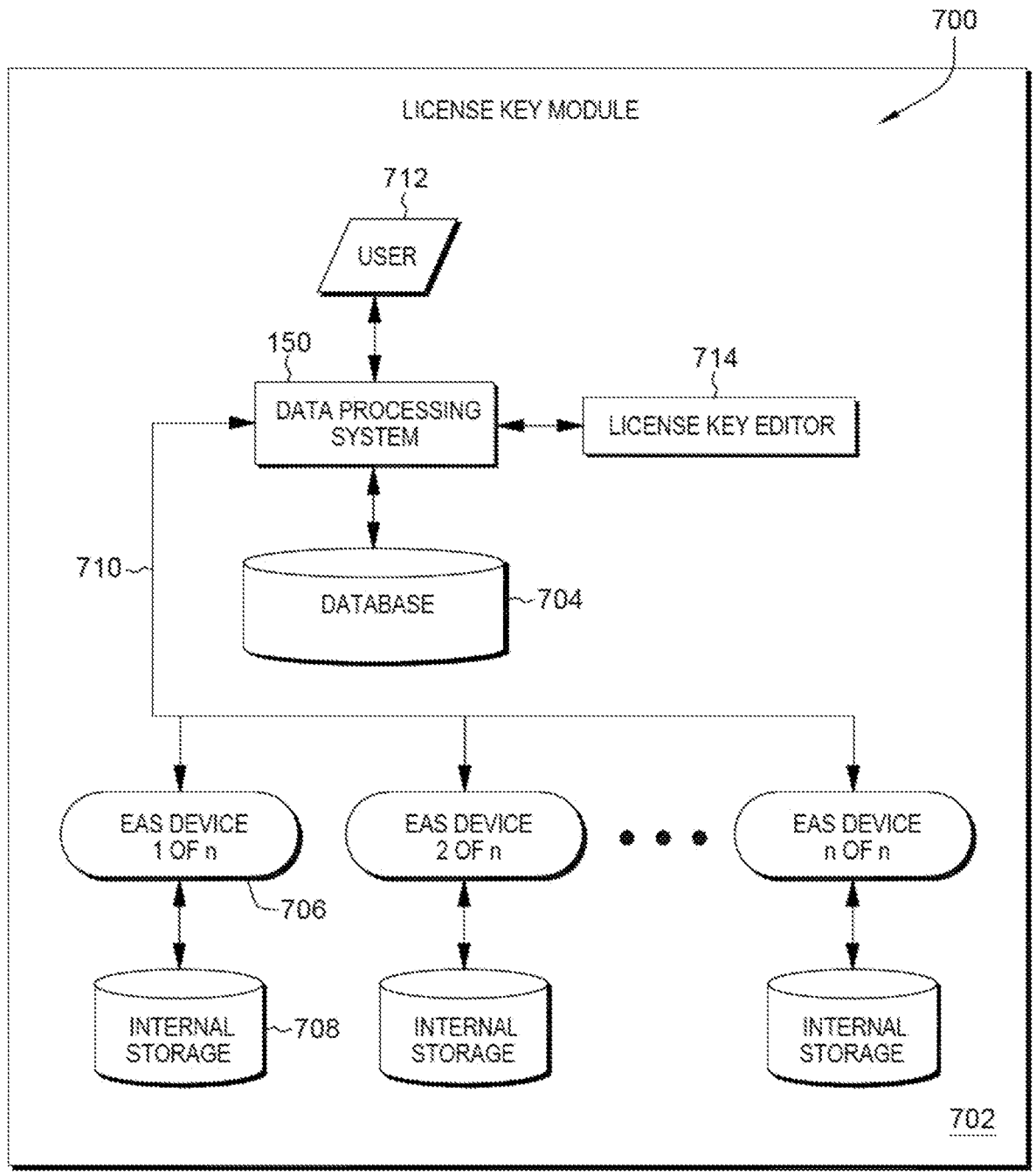
FIG. 7 is a modified flow diagram of one example of the operation of a License Key Module of the data processing system for monitoring EAS devices, in accordance with one or more aspects of the present disclosure.

FIG. 7 is a modified flow diagram 700 of one example of the operation of a License Key Module 702 of the data processing system 150 for monitoring and managing EAS devices, in accordance with one or more aspects of the present disclosure.

Features may be enabled through license keys and managing these on each device can be very time-consuming. The License Key Module manages and automates this process providing a unique global view of license keys, even enabling users to remotely enable/disable licensed features and manage license keys across the entire environment.

Each EAS device is assigned attributes using a licensing method to enable/disable specific features. These "keys" to the EAS device features are stored in the EAS Internal Storage, for example, internal storage 708. The EAS device communicates to the data processing system 150 over a bi-directional communications link 710 a data table of enabled or disabled features. A user 712 can use the License Key Editor 714 to edit the table to enable or disable any of the features for one or several EAS devices and communicate the updated state to each EAS device.

Figure 8:
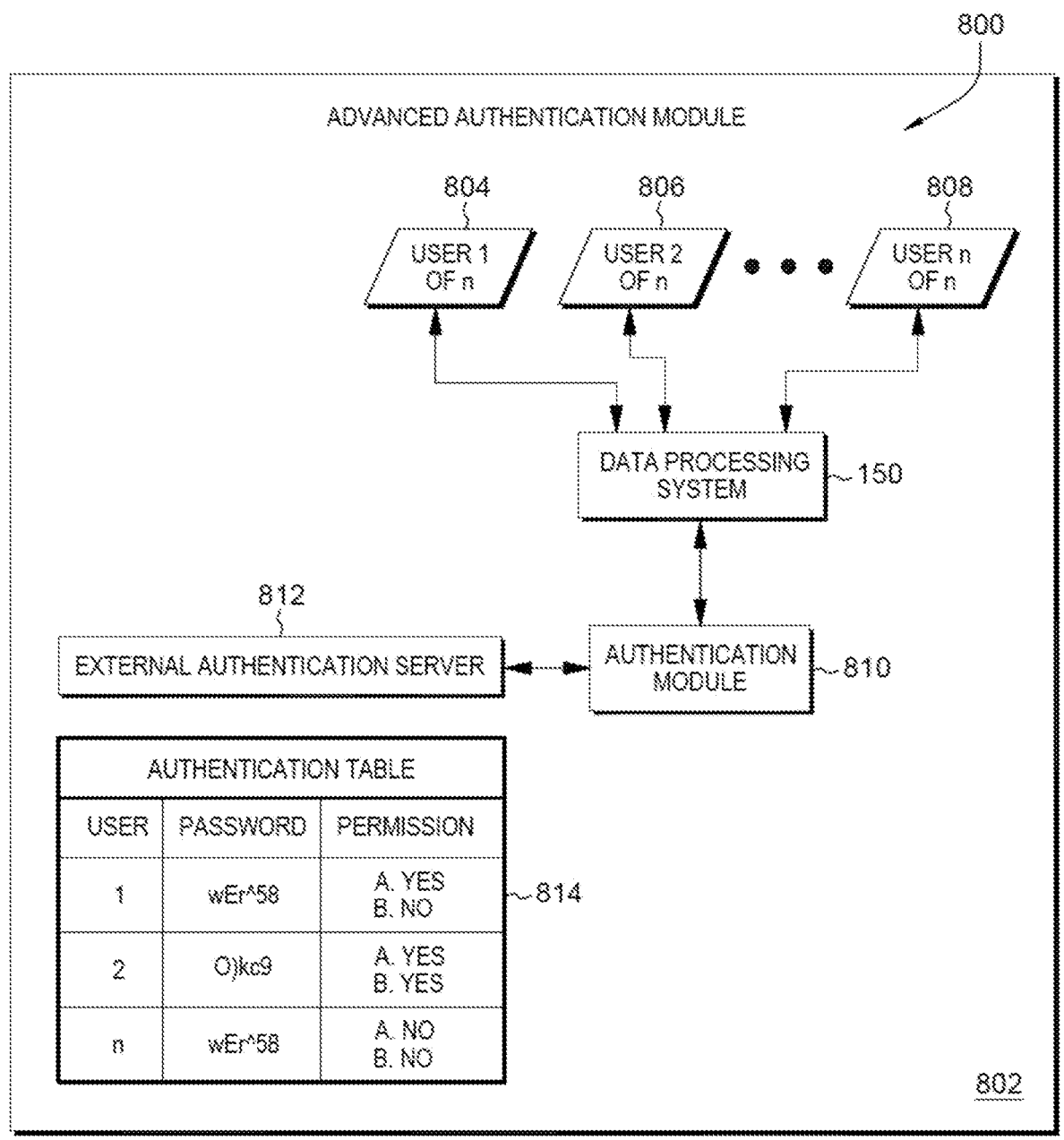
FIG. 8 is a modified flow diagram of one example of the operation of an Advanced Authentication Module of the data processing system for monitoring EAS devices, in accordance with one or more aspects of the present disclosure.

FIG. 8 is a modified flow diagram 800 of one example of the operation of an Advanced Authentication Module 802 of the data processing system 150 for monitoring and managing EAS devices, in accordance with one or more aspects of the present disclosure.

The Advanced Authentication Module enables the system to support (e.g., via Lightweight Directory Access Protocol (LDAP) or Remote Authentication Dial-In User Service (RADIUS)) authentication for centralized username and password management while certain permissions are maintained.

An External Authentication Server 812 provides centralized authentication, authorization and accounting of all users, for example, users 804, 806 and 808. This is shown as a simplified table labeled Authentication Table 814 in FIG. 8. The Authentication Module communicates with the External Authentication Server to present this information to the data processing system 150 allowing user controls to be externally set outside the data processing system itself.

Figure 9:
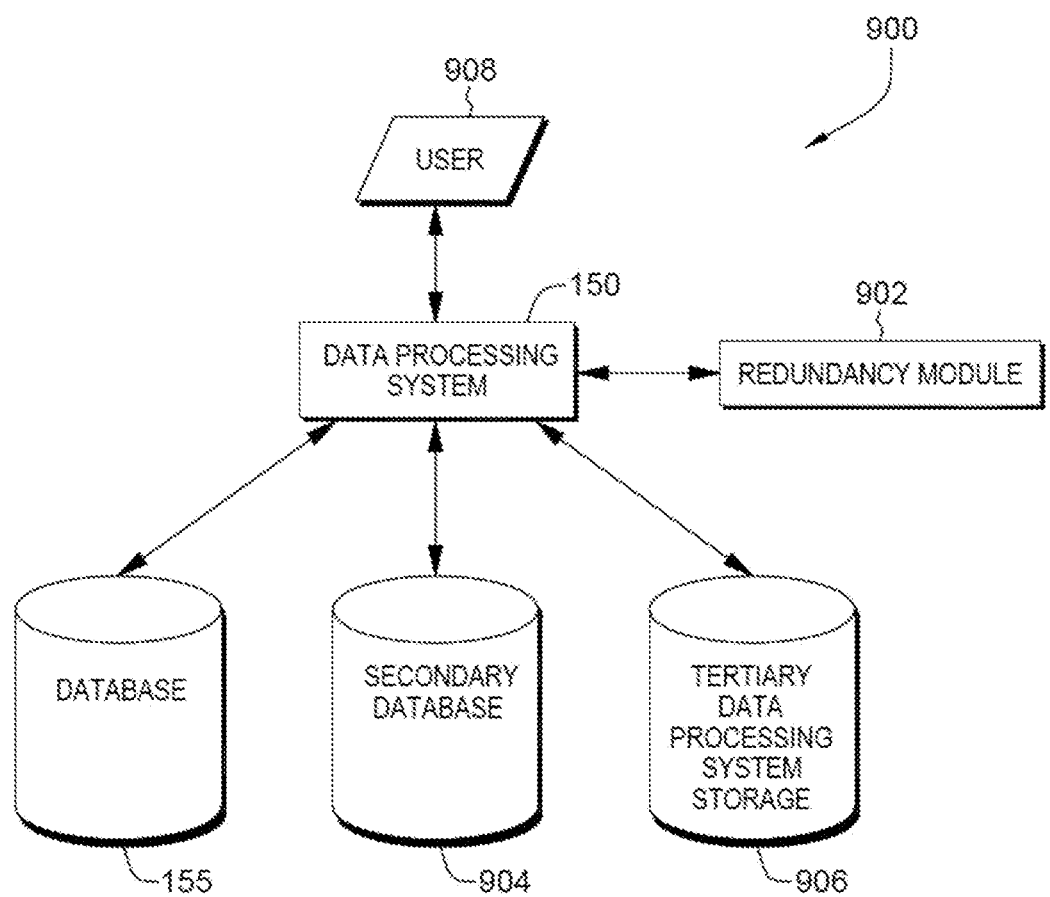
FIG. 9 is a modified flow diagram of one example of a Redundancy Module of the data processing system for monitoring EAS devices, in accordance with one or more aspects of the present disclosure.

FIG. 9 is a block diagram 900 of one example of a Redundancy Module 902 as part of the data processing system 150 for monitoring EAS devices, in accordance with one or more aspects of the present disclosure.

The Redundancy Module provides a secondary instance of the database to prevent a single point of failure. All data is, for example, mirrored on secondary data processing system storage 904 and, in one example, on tertiary data processing system storage 906 and automated failover is performed using a separate 'watchdog' application (not shown) to monitor and determine a need to switch operations between databases. Also, an administrator can force a manual changeover of the active server for maintenance or testing purposes. When the active server is changed, clients are automatically connected to the active server with no interaction necessary.

As noted, the data processing system 150, in one embodiment, hosts a Redundancy Module 902, which allows multiple storage systems to be used as secondary data processing system storage 904 and tertiary data processing system storage 906 as shown. The Redundancy Module control setting are performed through actions of the user 908.

Certain embodiments herein may offer various technical computing advantages involving computing advantages to address problems arising in the realm of computer networks. Particularly, computer networks operating to monitor EAS devices. Embodiments herein can include monitoring by the system for changes to configuration settings and updates to software and firmware (collectively, "changes") for the EAS devices. All such changes may be monitored and all such changes may lead to notifications. In one embodiment, all changes are notified to the proper individual(s). Further, the monitoring may avoid use of a threshold for the changes. In other words, no changes would be left out due to failing to meet some threshold. Embodiments herein can include aggregating by the system government required compliance logs for the EAS devices, resulting in aggregated compliance logs. Embodiments herein can include assisting by the system with generating one or more reports regarding the EAS devices, wherein the one or more reports comprise a consolidated compliance report for providing to one or more government agencies, the consolidated compliance report comprising the aggregated compliance logs. Embodiments herein can include notifying by the system at least one designated receiver of the changes. Various decision data structures can be used to drive artificial intelligence (AI) decision making, such as decision data structure that intelligently monitors EAS devices, for example, configuration settings changes and/or updates to software/firmware.

Decision data structures as set forth herein can be updated by machine learning so that accuracy and reliability is iteratively improved over time without resource consuming rules intensive processing. Machine learning processes can be performed for increased accuracy and for reduction of reliance on rules-based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer-based analytics and decision making. Embodiments herein can include particular arrangements for both collecting rich data into a data repository and additional particular arrangements for updating such data and for use of that data to drive artificial intelligence decision making.

In one embodiment, a cognitive computer system performs one or more of the functions herein. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

In a first aspect, disclosed above is a method of monitoring EAS devices. The method includes providing a system, the system including processor(s) in communication with memory(ies) storing instructions for execution by the processor(s), the instructions enabling monitoring EAS devices. The method further includes monitoring by the system for changes, the changes comprising all changes to configuration settings and updates to software and firmware for the EAS devices. The system further includes database(s) automatically storing data regarding the changes, wherein data regarding changes to configuration settings comprises a copy of the configuration settings, wherein the copy is stored chronologically, and the monitoring includes avoiding use of a threshold for the changes. The method further includes creating by the system secondary instance(s) of the database(s), monitoring by the system for failure(s) of the database(s) and automatically failing over to the secondary instance(s) when at least one of the failure(s) occurs, notifying by the system designated receiver(s) of one or more of the changes, and assisting by the system with at least one of filtering and sorting of selected data from the database.

In one example, the method may further include, for example, aggregating by the system government-required compliance log(s) for the EAS devices, resulting in aggregated compliance logs, and assisting by the system with generating report(s) regarding the EAS devices, wherein the report(s) include a consolidated compliance report for providing to government agencies, the consolidated compliance report including the aggregated compliance logs.

In one example, the method of the first aspect may further include, for example, customizable report templates for use in the generating.

In one example, the method of the first aspect may further include, for example, assisting by the system with customizing graphical user interface(s) (GUI) information display with assistance of the system.

In one example, the method of the first aspect may further include, for example, assisting by the system with managing license key(s) for use of aspect(s) of the system.

In one example, the method of the first aspect may further include, for example, assisting by the system with authenticating user identification and managing passwords.

In a second aspect, disclosed above is a system for monitoring Emergency Alert System (EAS) devices. The system includes processor(s), and memory(ies) in communication with the processor(s), the memory(ies) storing instructions for execution by the processor(s), the instructions enabling a method of monitoring EAS devices, the processor(s) and the memory(ies) with the instructions stored together being a system. The method includes monitoring by the system for changes, the changes comprising all changes to configuration settings and updates to software and firmware for the EAS devices, wherein the system further includes at least one database automatically storing data regarding the changes, wherein data regarding changes to configuration settings comprises a copy of the configuration settings, wherein the copy is stored chronologically, and the monitoring includes avoiding use of a threshold for the changes. The method further includes creating by the system secondary instance(s) of the database(s), monitoring by the system for failures of the database(s) and automatically failing over to the secondary instance(s) when at least one of the failures occurs. The method further includes notifying by the system designated receiver(s) of the changes, and assisting by the system with filtering and/or sorting of selected data from the database.

In one example, the system of the second aspect may further include, for example, aggregating by the system government-required compliance log(s) for the EAS devices, resulting in aggregated compliance logs, and assisting by the system with generating report(s) regarding the EAS devices, wherein the report(s) include a consolidated compliance report for providing to government agency(ies), the consolidated compliance report including the aggregated compliance logs.

In one example, the system of the second aspect with report generation may further include, for example, customizable report templates for use in the generating.

In one example, the system of the second aspect may further include, for example, assisting by the system with customizing graphical user interface(s) (GUI) information display.

In one example, the system of the second aspect may further include, for example, assisting by the system with managing license key(s) for use of aspects(s) of the system.

In one example, the system of the second aspect may further include, for example, assisting by the system with authenticating user identification and managing passwords.

In a third aspect, disclosed above is a computer program product. The computer program product includes a non-transitory storage medium readable by processor(s), the non-transitory storage medium storing instructions for execution by the processor(s) for performing a method of monitoring Emergency Alert System (EAS) devices. The method includes monitoring by the system for changes, the changes comprising all changes to configuration settings and updates to software and firmware for the EAS devices, wherein the system further includes database(s) automatically storing data regarding the changes, wherein data regarding changes to configuration settings comprises a copy of the configuration settings, wherein the copy is stored chronologically, and wherein the monitoring includes avoiding use of a threshold for the changes. The method further includes creating by the system secondary instance(s) of the database(s), monitoring by the system for one or more failures of the database(s) and automatically failing over to the secondary instance(s) when at least one of the failures occurs, notifying by the system designated receiver(s) of the changes, and assisting by the system with at least one of filtering and sorting for selected data from the database.

In one example, the method of the computer program product of the third aspect may further include, for example, aggregating by the system government-required compliance logs for the EAS devices, resulting in aggregated compliance logs, and assisting by the system with generating report(s) regarding the EAS devices, wherein the report(s) include a consolidated compliance report for providing to government agencies, the consolidated compliance report including the aggregated compliance logs.

In one example, the method of the third aspect may further include, for example, customizable report templates for use in generating the report(s).

In one example, the method of the third aspect may further include, for example, assisting by the system with customizing graphical user interface(s) (GUI) information display.

In one example, the method of the third aspect may further include, for example, assisting by the system with managing license keys for use of aspects of the system.

In one example, the method of the third aspect may further include, for example, assisting by the system with authenticating user identification and managing passwords.

In a fourth aspect disclosed above is a method of monitoring Emergency Alert System (EAS) devices. The method includes providing a system, the system including processor(s) in communication with memory(ies) storing instructions for execution by the processor(s), the instructions enabling monitoring EAS devices. The method further includes monitoring by the system for any changes, the changes comprising all changes to configuration settings and updates to software and firmware for the EAS devices. The system further includes database(s) automatically storing data regarding the changes, wherein data regarding changes to configuration settings comprises a copy of the configuration settings, and wherein the copy is stored chronologically. The method of the fourth aspect may further include creating by the system secondary instance(s) of the at least one database, monitoring by the system for failures of the database(s) and automatically failing over to the secondary instance(s) when at least one of the failures occurs, notifying by the system designated receiver(s) of the change(s), and assisting by the system with at least one of filtering and sorting of selected data from the database.

In a fifth aspect, disclosed above is a system for monitoring Emergency Alert System (EAS) devices. The system includes processor(s), and memory(ies) in communication with the processor(s), the memory(ies) storing instructions for execution by the processor(s), the instructions enabling a method of monitoring EAS devices, the processor(s) and the memory(ies) with the instructions stored including a system. The method includes monitoring by the system for any changes, the changes comprising all changes to configuration settings and updates to software and firmware for the EAS devices, wherein the system further includes database(s) automatically storing data regarding the changes, wherein data regarding changes to configuration settings comprises a copy of the configuration settings, and wherein the copy is stored chronologically. The method further includes creating by the system secondary instance(s) of the at least one database, monitoring by the system for failures of the database(s) and automatically failing over to the secondary instance(s) when at least one of the failures occurs, notifying by the system designated receiver(s) of the change(s), and assisting by the system with at least one of filtering and sorting of selected data from the database.

In a sixth aspect, disclosed above is a computer program product. The computer program product includes a non-transitory storage medium readable by processor(s), the non-transitory storage medium storing instructions for execution by the processor(s) for performing a method of monitoring Emergency Alert System (EAS) devices, the method including: monitoring by the system for any changes, the changes including changes to configuration settings and updates to software and firmware for the EAS devices, the system further including database(s) automatically storing data regarding the changes, wherein data regarding changes to configuration settings comprises a copy of the configuration settings, and wherein the copy is stored chronologically; creating by the system secondary instance(s) of the database(s); monitoring by the system for failure(s) of the database(s) and automatically failing over to the secondary instance(s) when at least one of the failures occurs; notifying by the system designated receiver(s) of one or more of the changes; and assisting by the system with at least one of filtering and sorting of selected data from the database.

EAS Monitoring, in accordance with the present disclosure, provides, for example, a single aggregation of all EAS devices and provides, for example, information and control to all users throughout an enterprise with one secure login. Customizable User Interfaces (e.g., customized dashboards, tables and screen layouts) display information specific to individual job responsibilities (e.g., engineering, legal, compliance, etc.). Highly Configurable User and Permissions Settings provide full functionality and access to specific individuals or groups, while limiting access/control to others. Viewing and Interacting with all EAS devices within a single user interface includes, for example, seeing the entire network and assures all sites are operating properly or quickly spot issues while providing SME's fast access to make any necessary corrections. Configuration monitoring reduces manpower and errors by storing all configuration files. Alert Message Logging/Reporting tracks EAS-related information from a single user interface to create customized reports for compliance/inventory management. Automatic and Manual EAS Device Registration quickly builds connections and data exchanges with "Trust Circle" approvals ensuring only those devices are included. Master License Key Management enables/disables specific features selectively or universally to control functions of a single or groups of devices. System Health Monitoring's unique message exchange assures devices are operating at peak performance by, for example, identifying potential issues early. Alarm Notification creates conditional alarms with message notifications and access to external monitoring systems from a single point, rather than hundreds of separate sites. High Scalability provides management from 1 to 1000's of devices and installs specific modules befitting the requirements. High-performance SQL Database with Optional Hot-Swap Redundancy provides the ability to store, view and archive data in a secure, reliable and industry-standard database with options to mirror data and monitor up-time performance and support third-party data access.

For reference, below is a listing of relevant FCC function and testing requirements for EAS devices, current as of the filing of the application; FCC Part 11, subparts 11.32-11.34 and 11.56:

§ 11.32 EAS Encoder.

(a) EAS Encoders must at a minimum be capable of encoding the EAS protocol described in § 11.31 and providing the EAS code transmission requirements described in § 11.51. EAS encoders must additionally provide the following minimum specifications:

(1) Encoder programming. Access to encoder programming shall be protected by a lock or other security measures and be configured so that authorized personnel can readily select and program the EAS Encoder with Originator, Event and Location codes for either manual or automatic operation.

(2) Inputs. The encoder shall have at least one input port used for audio messages and at least one input port used for data messages.

(3) Outputs. The encoder shall have at least one audio output port and at least one data output port.

(4) Calibration. EAS Encoders must provide a means to comply with the modulation levels required in § 11.51(f).

(5) Day-Hour-Minute and Identification Stamps. The encoder shall affix the JJJHHMM and LLLLLLLL codes automatically to all initial messages.

(6) Program Data Retention. Program data and codes shall be retained even with the power removed.

(7) Indicator An aural or visible means that it activated when the Preamble is sent and deactivated at the End of Message code.

(8) Spurious Response. All frequency components outside 200 to 4000 Hz shall be attenuated by 40 dB or more with respect to the output levels of the mark or space frequencies.

(9) Attention Signal generator The encoder must provide an attention signal that complies with the following:

(i) Tone Frequencies. The audio tones shall have fundamental frequencies of 853 and 960 Hz and not vary over ±0.5 Hz.

(ii) Harmonic Distortion. The total harmonic distortion of each of the audio tones may not exceed 5% at the encoder output terminals.

(iii) Minimum Level of Output. The encoder shall have an output level capability of at least +8 dBm into a 600 Ohm load impedance at each audio tone. A means shall be provided to permit individual activation of the two tones for calibration of associated systems.

(iv) Time Period for Transmission of Tones. The encoder shall have timing circuitry that automatically generates the two tones simultaneously for a time period of 8 seconds.

(v) Inadvertent activation. The switch used for initiating the automatic generation of the simultaneous tones shall be protected to prevent accidental operation.

(vi) Indicator Display. The encoder shall be provided with a visual and/or aural indicator which clearly shows that the Attention Signal is activated.

(b) Operating Temperature and Humidity. Encoders shall have the ability to operate with the above specifications within an ambient temperature range of 0 to +50 degrees C. and a range of relative humidity of up to 95%.

(c) Primary Supply Voltage Variation. Encoders shall be capable of complying with the requirements of this section during a variation in primary supply voltage of 85 percent to 115 percent of its rated value.

(d) Testing Encoder Units. Encoders not covered by § 11.34(e) of this part shall be tested in a 10 V/m minimum RF field at an AM broadcast frequency and a 0.5 V/m minimum RF field at an FM or TV broadcast frequency to simulate actual working conditions.

[59 FR 67092, Dec. 28, 1994, as Amended at 77 FR 16703, Mar. 22, 2012]

§ 11.33 EAS Decoder.

(a) An EAS Decoder must at a minimum be capable of providing the EAS monitoring functions described in § 11.52, decoding EAS messages formatted in accordance with the EAS Protocol described in § 11.31, and converting Common Alerting Protocol (CAP)-formatted EAS messages into EAS alert messages that comply with the EAS Protocol, in accordance with § 11.56(a)(2), with the exception that the CAP-related monitoring and conversion requirements set forth in §§ 11.52(d)(2) and 11.56(a)(2) can be satisfied via an Intermediary Device, as specified in § 11.56(b), provided that all other requirements set forth in this part are met. An EAS Decoder also must be capable of the following minimum specifications:

(1) Inputs. Decoders must have the capability to receive at least two audio inputs from EAS monitoring assignments, and at least one data input. The data input(s) may be used to monitor other communications modes such as Radio Broadcast Data System (RBDS), NWR, satellite, public switched telephone network, or any other source that uses the EAS protocol.

(2) Valid codes. There must be a means to determine if valid EAS header codes are received and to determine if preselected header codes are received.

(3) Storage. Decoders must provide the means to:

(i) Record and store, either internally or externally, at least two minutes of audio or text messages. A decoder manufactured without an internal means to record and store audio or text must be equipped with a means (such as an audio or digital jack connection) to couple to an external recording and storing device.

(ii) Store at least ten preselected event and originator header codes, in addition to the seven mandatory event originator codes for tests and national activations, and store any preselected location codes for comparison with incoming header codes. A non-preselected header code that is manually transmitted must be stored for comparison with later incoming header codes. The header codes of the last ten received valid messages which still have valid time periods must be stored for comparison with the incoming valid header codes for later messages. These last received header codes will be deleted from storage as their valid time periods expire.

(4) Display and logging. For received alert messages formatted in both the EAS Protocol and Common Alerting Protocol, a visual message shall be developed from any valid header codes for tests and national activations and any preselected header codes received. The message shall at a minimum include the Originator, Event, Location, the valid time period of the message and the local time the message was transmitted. The message shall be in the primary language of the EAS Participant and be fully displayed on the decoder and readable in normal light and darkness. The visual message developed from received alert messages formatted in the Common Alerting Protocol must conform to the requirements in §§ 11.51(d), (g)(3), (h)(3), and (i)(2) of this part. All existing and new models of EAS decoders manufactured after Aug. 1, 2003 must provide a means to permit the selective display and logging of EAS messages containing header codes for state and local EAS events. Effective May 16, 2002, analog radio and television broadcast stations, analog cable systems and wireless cable systems may upgrade their decoders on an optional basis to include a selective display and logging capability for EAS messages containing header codes for state and local events. EAS Participants that install or replace their decoders after Feb. 1, 2004 must install decoders that provide a means to permit the selective display and logging of EAS messages containing header codes for state and local EAS events.

(5) Indicators. EAS decoders must have a distinct and separate aural or visible means to indicate when any of the following conditions occurs:

(i) Any valid EAS header codes are received as specified in § 11.33(a)(10).

(ii) Preprogrammed header codes, such as those selected in accordance with § 11.52(d)(2) are received.

(iii) A signal is present at each audio input that is specified in § 11.33(a)(1).

(6) Program Data Retention. The program data must be retained even with power removed.

(7) Outputs. Decoders shall have at least one data port where received valid EAS header codes and received preselected header codes are available, at least one audio port that is capable of monitoring each decoder audio input, and an internal speaker to enable personnel to hear audio from each input.

(8) Decoder Programming. Access to decoder programming shall be protected by a lock or other security measures and be configured so that authorized personnel can readily select and program the EAS Decoder with preselected Originator, Event and Location codes for either manual or automatic operation.

(9) Reset. There shall be a method to automatically or manually reset the decoder to the normal monitoring condition. Operators shall be able to select a time interval, not less than two minutes, in which the decoder would automatically reset if it received an EAS header code but not an end-of-message (EOM) code. Messages received with the EAN Event codes shall disable the reset function so that lengthy audio messages can be handled. The last message received with valid header codes shall be displayed as required by paragraph (a)(4) of this section before the decoder is reset.

(10) Message Validity An EAS Decoder must provide error detection and validation of the header codes of each message to ascertain if the message is valid. Header code comparisons may be accomplished through the use of a bit-by-bit compare or any other error detection and validation protocol. A header code must only be considered valid when two of the three headers match exactly; the Origination Date/Time field (JJJHHMM) is not more than 15 minutes in the future and the expiration time (Origination Date/Time plus Valid Time TTTT) is in the future (i.e., current time at the EAS equipment when the alert is received is between origination time minus 15 minutes and expiration time). Duplicate messages must not be relayed automatically.

(11) A header code with the EAN Event code specified in § 11.31(c) that is received through any of the audio or data inputs must override all other messages.

(b) Decoders shall be capable of operation within the tolerances specified in this section as well as those in § 11.32 (b), (c) and (d).

[59 FR 67092, Dec. 28, 1994, as amended at 60 FR 55999, Nov. 6, 1995; 67 FR 18510, Apr. 16, 2002; 70 FR 71033, Nov. 25, 2005; 77 FR 16703, Mar. 22, 2012; 83 FR 39620, Aug. 10, 2018]

§ 11.34 Acceptability of the equipment.

(a) An EAS Encoder used for generating the EAS codes and the Attention Signal must be Certified in accordance with the procedures in part 2, subpart J, of this chapter. The data and information submitted must show the capability of the equipment to meet the requirements of this part as well as the requirements contained in part 15 of this chapter for digital devices.

(b) Decoders used for the detection of the EAS codes and receiving the Attention Signal must be Certified in accordance with the procedures in part 2, subpart J, of this chapter. The data and information submitted must show the capability of the equipment to meet the requirements of this part as well as the requirements contained in part 15 of this chapter for digital devices.

(c) The functions of the EAS decoder, Attention Signal generator and receiver, and the EAS encoder specified in §§

11.31, 11.32 and 11.33 may be combined and Certified as a single unit provided that the unit complies with all specifications in this rule section.

(d) Manufacturers must include instructions and information on how to install, operate and program an EAS Encoder, EAS Decoder, or combined unit and a list of all State and county ANSI numbers with each unit sold or marketed in the U.S.

(e) Waiver requests of the Certification requirements for EAS Encoders or EAS Decoders which are constructed for use by an EAS Participant, but are not offered for sale will be considered on an individual basis in accordance with part 1, subpart G, of this chapter.

(f) Modifications to existing authorized EAS decoders, encoders or combined units necessary to implement the new EAS codes specified in § 11.31 and to implement the selective displaying and logging feature specified in § 11.33(a)(4) will be considered Class I permissive changes that do not require a new application for and grant of equipment certification under part 2, subpart J of this chapter.

(g) All existing and new models of EAS encoders, decoders and combined units manufactured after Aug. 1, 2003 must be capable of generating and detecting the new EAS codes specified in § 11.31 in order to be certified under part 2, subpart J of this chapter. All existing and new models of EAS decoders and combined units manufactured after Aug. 1, 2003 must have the selective displaying and logging capability specified in § 11.33(a)(4) in order to be certified under part 2, subpart J of this chapter.

[59 FR 67092, Dec. 28, 1994, as amended at 60 FR 56000, Nov. 6, 1995; 67 FR 18510, Apr. 16, 2002; 70 FR 71034, Nov. 25, 2005; 77 FR 16703, Mar. 22, 2012]

(5) Upon completion of the State or Local Area EAS transmission procedures, resume normal programming until receipt of the cue from the SR or LP sources in your Local Area. At that time begin transmitting the common emergency message received from the above sources.

(6) Resume normal operations upon conclusion of the message.

(7) The times of the above EAS actions must be entered in the EAS Participants' records as specified in §§ 11.35(a) and 11.54(a)(3).

(8) Use of the EAS codes or Attention Signal automatically grants rebroadcast authority as specified in § 11.54(b).

(d) Immediately upon receipt of a State or Local Area EAS message that has been formatted in the Common Alerting Protocol, EAS Participants must do the following:

(1) EAS Participants participating in the State or Local Area EAS must follow the procedures for processing such messages in the State and Local Area Plans.

(2) Analog and digital television broadcast stations must transmit all EAS announcements visually and aurally as specified in § 11.51(a) through (e) and 73.1250(h) of this chapter, as applicable; analog cable systems, digital cable systems, and wireless cable systems must transmit all EAS announcements visually and aurally as specified in § 11.51 (g) and (h); and DBS providers must transmit all EAS announcements visually and aurally as specified in § 11.51 (i). EAS Participants providing foreign language programming should transmit all EAS announcements in the same language as the primary language of the EAS Participant.

(3) Resume normal operations upon conclusion of the message.

(4) The times of the above EAS actions must be entered in the EAS Participants' records as specified in §§ 11.35(a) and 11.54(a)(3).

[59 FR 67092, Dec. 28, 1994, as amended at 63 FR 29666, Jun. 1, 1998; 65 FR 21658, Apr. 24, 2000; 67 FR 18511, Apr. 16, 2002; 70 FR 71037, Nov. 25, 2005; 71 FR 76220, Dec. 20, 2006; 72 FR 62135, Nov. 2, 2007; 77 FR 16706, Mar. 22, 2012; 83 FR 37759, Aug. 2, 2018]

§ 11.56 Obligation to process CAP-formatted EAS messages.

(a) On or by Jun. 30, 2012, EAS Participants must have deployed operational equipment that is capable of the following:

(1) Acquiring EAS alert messages in accordance with the monitoring requirements in § 11.52(d)(2);

(2) Converting EAS alert messages that have been formatted pursuant to the Organization for the Advancement of Structured Information Standards (OASIS) Common Alerting Protocol Version 1.2 (Jul. 1, 2010), and Common Alerting Protocol, v. 1.2 USA Integrated Public Alert and Warning System Profile Version 1.0 (Oct. 13, 2009), into EAS alert messages that comply with the EAS Protocol, such that the Preamble and EAS Header Codes, audio Attention Signal, audio message, and Preamble and EAS End of Message (EOM) Codes of such messages are rendered equivalent to the EAS Protocol (set forth in § 11.31), in accordance with the technical specifications governing such conversion process set forth in the EAS-CAP Industry Group's (ECIG) Recommendations for a CAP EAS Implementation Guide, Version 1.0 (May 17, 2010) (except that any and all specifications set forth therein related to gubernatorial "must carry" shall not be followed, and that EAS Participants may adhere to the specifications related to text-to-speech on a voluntary basis).

(3) Processing such converted messages in accordance with the other sections of this part.

(b) EAS Participants may comply with the requirements of this section by deploying an Intermediary Device. If an EAS Participant elects to meet the requirements of this section by deploying an Intermediary Device, it shall be required to construct visual messages from CAP-formatted EAS messages in accordance with § 3.6 of the "ECIG Recommendations for a CAP EAS Implementation Guide, Version 1.0" (May 17, 2010), as set forth in §§ 11.51(d), (g)(3), (h)(3), and (i)(2) of this part, on or by Jun. 30, 2015.

(c) EAS Participants shall configure their systems to reject all CAP-formatted EAS messages that include an invalid digital signature.

(d) The standards required in this section are incorporated by reference into this section with the approval of the Director of the Federal Register under 5 U.S.C. 552(a) and 1 CFR part 51. To enforce any edition other than that specified in this section, the Federal Communications Commission must publish notice of change in the FEDERAL REGISTER and the material must be available to the public. All approved material is available for inspection at the Federal Communications Commission, located at the address indicated in 47 CFR 0.401(a) (Reference Information Center), and is available from the sources indicated in this paragraph (d). It is also available for inspection at the National Archives and Records Administration (NARA). For information on the availability of this material at NARA, call 202-741-6030 or go to http://www. archives. gov/federal_register/code_of_federal_regulations/ibr_locations.html.

(1) The following standard is available from the EAS-CAP Industry Group (ECIG), 21010 Southbank Street, #365, Sterling, Va. 20165, or go to http://www.eas-cap.org.

(i) "ECIG Recommendations for a CAP EAS Implementation Guide, Version 1.0" (May 17, 2010).

(ii) [Reserved]

(2) The following standards are available from Organization for the Advancement of Structured Information Standards (OASIS), 25 Corporate Drive, Suite 103, Burlington, Mass. 01803-4238, call 781-425-5073, or go to http://www.oasis-open.org.

(i) "Common Alerting Protocol Version 1.2" (Jul. 1, 2010).

(ii) "Common Alerting Protocol, v. 1.2 USA Integrated Public Alert and Warning System Profile Version 1.0" (Oct. 13, 2009).

[77 FR 16706, Mar. 22, 2012, as amended at 77 FR 26703, May 7, 2012; 83 FR 39621, Aug. 10, 2018; 85 FR 64406, Oct. 13, 2020]

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

The invention claimed is:

1. A method of monitoring Emergency Alert System (EAS) devices, the method comprising:
   providing a system, the system comprising at least one processor in communication with at least one memory storing instructions for execution by the at least one processor, the instructions enabling monitoring a plurality of EAS devices;
   monitoring by the system for changes, the changes comprising all changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes;
   creating by the system at least one secondary instance of the at least one database;
   monitoring by the system for one or more failures of the at least one database and automatically failing over to the at least one secondary instance when at least one of the one or more failures occurs;
   notifying by the system at least one designated receiver of one or more of the changes;
   assisting by the system with at least one of filtering and sorting of selected data from the database;
   aggregating by the system one or more government-required compliance logs for the plurality of EAS devices, resulting in aggregated compliance logs; and
   assisting by the system with generating one or more reports regarding the plurality of EAS devices, wherein the one or more reports comprise a consolidated compliance report for providing to one or more government agencies, the consolidated compliance report comprising the aggregated compliance logs; and
   further comprising assisting by the system with managing one or more license keys for use of one or more aspects of the system.

2. The method of claim 1, wherein the system further comprises customizable report templates for use in the generating.

3. The method of claim 1, further comprising assisting by the system with customizing at least one graphical user interface (GUI) information display.

4. The method of claim 1, further comprising assisting by the system with authenticating user identification and managing passwords.

5. A system for monitoring Emergency Alert System (EAS) devices, the system comprising:
   at least one processor; and
   at least one memory in communication with the at least one processor, the at least one memory storing instructions for execution by the at least one processor, the instructions enabling a method of monitoring a plurality of EAS devices, the at least one processor and the at least one memory with the instructions stored comprising a system, the method comprising:
   monitoring by the system for changes, the changes comprising all changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes;
   creating by the system at least one secondary instance of the at least one database;
   monitoring by the system for one or more failures of the at least one database and automatically failing over to the at least one secondary instance when at least one of the one or more failures occurs;
   notifying by the system at least one designated receiver of one or more of the changes;
   assisting by the system with at least one of filtering and sorting selected data from the database;
   aggregating by the system one or more government-required compliance logs for the plurality of EAS devices, resulting in aggregated compliance logs; and
   assisting by the system with generating one or more reports regarding the plurality of EAS devices, wherein the one or more reports comprise a consolidated compliance report for providing to one or more government agencies, the consolidated compliance report comprising the aggregated compliance logs; and
   further comprising assisting by the system with managing one or more license keys for use of one or more aspects of the system.

6. The system of claim 5, wherein the system further comprises customizable report templates for use in the generating.

7. The system of claim 5, further comprising assisting by the system with customizing at least one graphical user interface (GUI) information display.

8. The system of claim 5, further comprising assisting by the system with authenticating user identification and managing passwords.

9. A computer program product, comprising:
a non-transitory storage medium readable by at least one processor, the non-transitory storage medium storing instructions for execution by the at least one processor for performing a method of monitoring Emergency Alert System (EAS) devices, the method comprising:
monitoring by the system for changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, wherein the copy is stored chronologically, and wherein the monitoring comprises avoiding use of a threshold for the changes;
creating by the system at least one secondary instance of the at least one database;
monitoring by the system for one or more failures of the at least one database and automatically failing over to the at least one secondary instance when at least one of the one or more failures occurs;
notifying by the system at least one designated receiver of one or more of the changes;
assisting by the system with at least one of filtering and sorting for selected data from the database;
aggregating by the system one or more government-required compliance logs for the plurality of EAS devices, resulting in aggregated compliance logs; and
assisting by the system with generating one or more reports regarding the plurality of EAS devices, wherein the one or more reports comprise a consolidated compliance report for providing to one or more government agencies, the consolidated compliance report comprising the aggregated compliance logs; and
further comprising assisting by the system with managing one or more license keys for use of one or more aspects of the system.

10. The computer program product of claim 9, wherein the system further comprises customizable report templates for use in the generating.

11. The computer program product of claim 9, wherein the method further comprises assisting by the system with customizing at least one graphical user interface (GUI) information display.

12. The computer program product of claim 9, wherein the method further comprises assisting by the system with authenticating user identification and managing passwords.

13. A method of monitoring Emergency Alert System (EAS) devices, the method comprising:
providing a system, the system comprising at least one processor in communication with at least one memory storing instructions for execution by the at least one processor, the instructions enabling monitoring a plurality of EAS devices;
monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, and wherein the copy is stored chronologically;
creating by the system at least one secondary instance of the at least one database;
monitoring by the system for one or more failures of the at least one database and automatically failing over to the at least one secondary instance when at least one of the one or more failures occurs;
notifying by the system at least one designated receiver of one or more of the changes;
assisting by the system with at least one of filtering and sorting of selected data from the database;
aggregating by the system one or more government-required compliance logs for the plurality of EAS devices, resulting in aggregated compliance logs, and
assisting by the system with generating one or more reports regarding the plurality of EAS devices, wherein the one or more reports comprise a consolidated compliance report for providing to one or more government agencies, the consolidated compliance report comprising the aggregated compliance logs; and
further comprising assisting by the system with managing one or more license keys for use of one or more aspects of the system.

14. A system for monitoring Emergency Alert System (EAS) devices, the system comprising:
at least one processor; and
at least one memory in communication with the at least one processor, the at least one memory storing instructions for execution by the at least one processor, the instructions enabling a method of monitoring a plurality of EAS devices, the at least one processor and the at least one memory with the instructions stored comprising a system, the method comprising:
providing a system, the system comprising at least one processor in communication with at least one memory storing instructions for execution by the at least one processor, the instructions enabling monitoring a plurality of EAS devices;
monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, and wherein the copy is stored chronologically;
creating by the system at least one secondary instance of the at least one database;
monitoring by the system for one or more failures of the at least one database and automatically failing over to the at least one secondary instance when at least one of the one or more failures occurs;
notifying by the system at least one designated receiver of one or more of the changes;
assisting by the system with at least one of filtering and sorting of selected data from the database;
aggregating by the system one or more government-required compliance logs for the plurality of EAS devices, resulting in aggregated compliance logs; and
assisting by the system with generating one or more reports regarding the plurality of EAS devices, wherein the one or more reports comprise a consolidated compliance report for providing to one or more government agencies, the consolidated compliance report comprising the aggregated compliance logs; and
further comprising assisting by the system with managing one or more license keys for use of one or more aspects of the system.

15. A computer program product, comprising:

a non-transitory storage medium readable by at least one processor, the non-transitory storage medium storing instructions for execution by the at least one processor for performing a method of monitoring Emergency Alert System (EAS) devices, the method comprising:

monitoring by the system for any changes, the changes comprising changes to configuration settings and updates to software and firmware for the plurality of EAS devices, wherein the system further comprises at least one database automatically storing data regarding the changes, wherein data regarding changes to configuration settings comprises a copy of the configuration settings, and wherein the copy is stored chronologically;

creating by the system at least one secondary instance of the at least one database;

monitoring by the system for one or more failures of the at least one database and automatically failing over to the at least one secondary instance when at least one of the one or more failures occurs;

notifying by the system at least one designated receiver of one or more of the changes;

assisting by the system with at least one of filtering and sorting of selected data from the database;

aggregating by the system one or more government-required compliance logs for the plurality of EAS devices, resulting in aggregated compliance logs; and assisting by the system with generating one or more reports regarding the plurality of EAS devices, wherein the one or more reports comprise a consolidated compliance report for providing to one or more government agencies, the consolidated compliance report comprising the aggregated compliance logs; and further comprising assisting by the system with managing one or more license keys for use of one or more aspects of the system.

\* \* \* \* \*